Oct. 13, 1931.  J. S. STULL  1,827,302
MATERIAL WORKING APPARATUS
Filed Feb. 15, 1927  5 Sheets-Sheet 2

Inventor
John S. Stull
by [signature] Att'y.

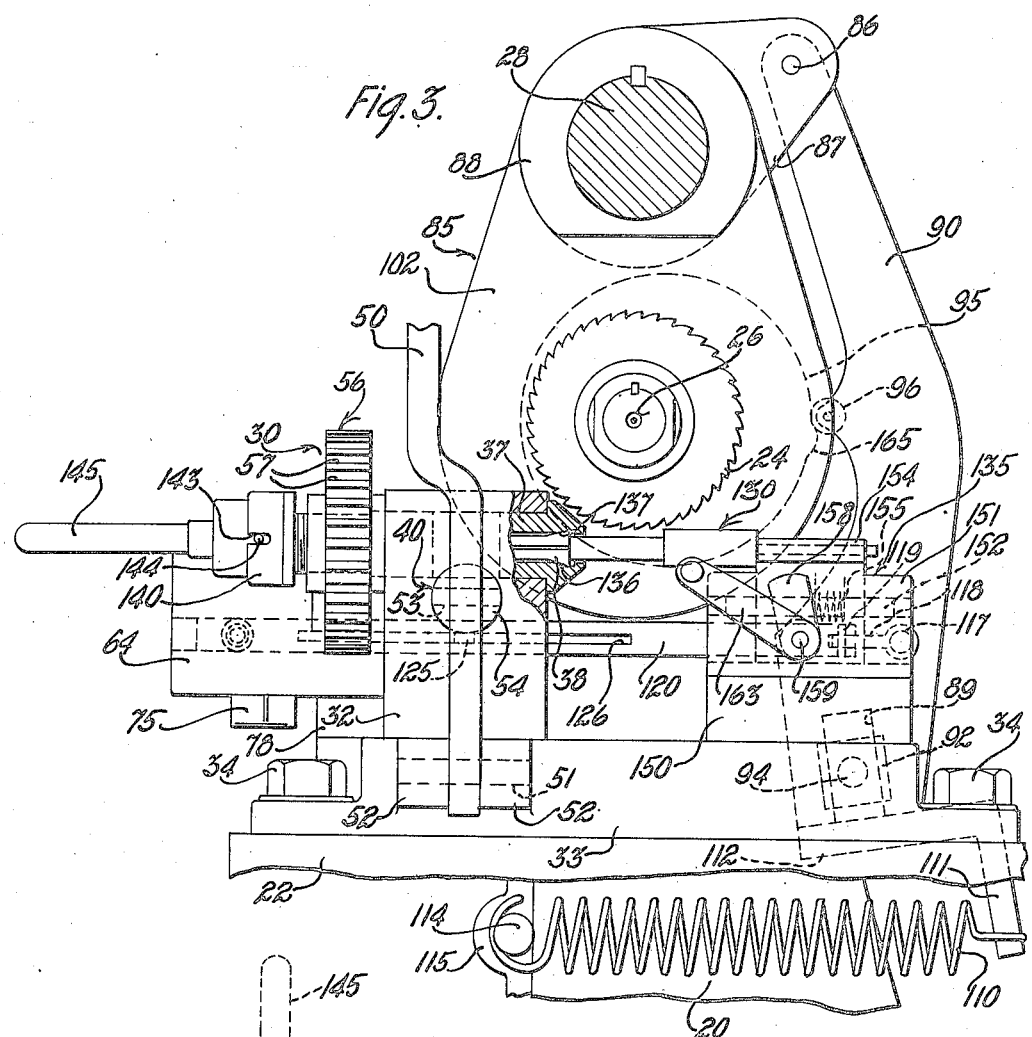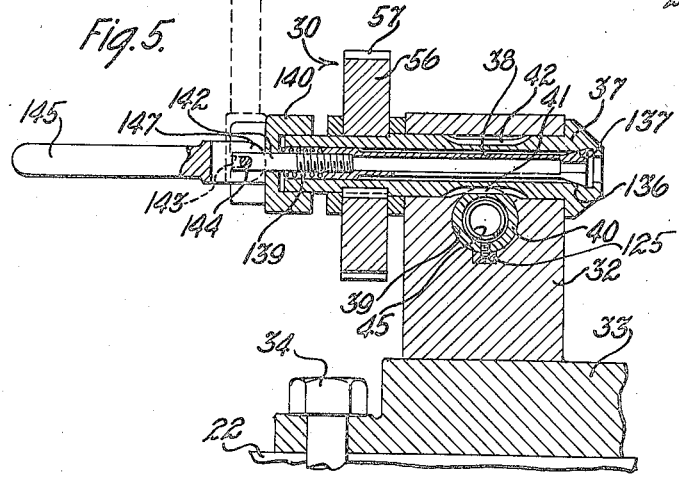

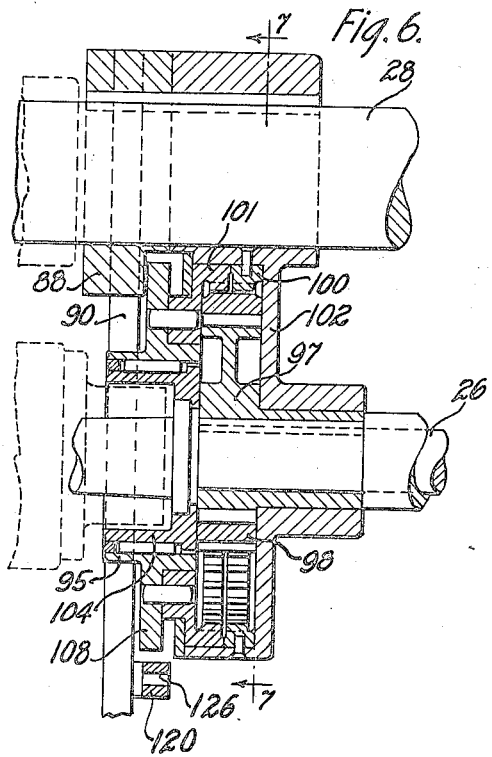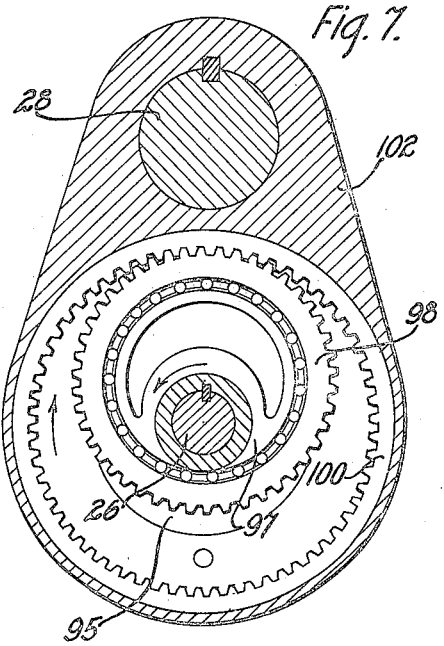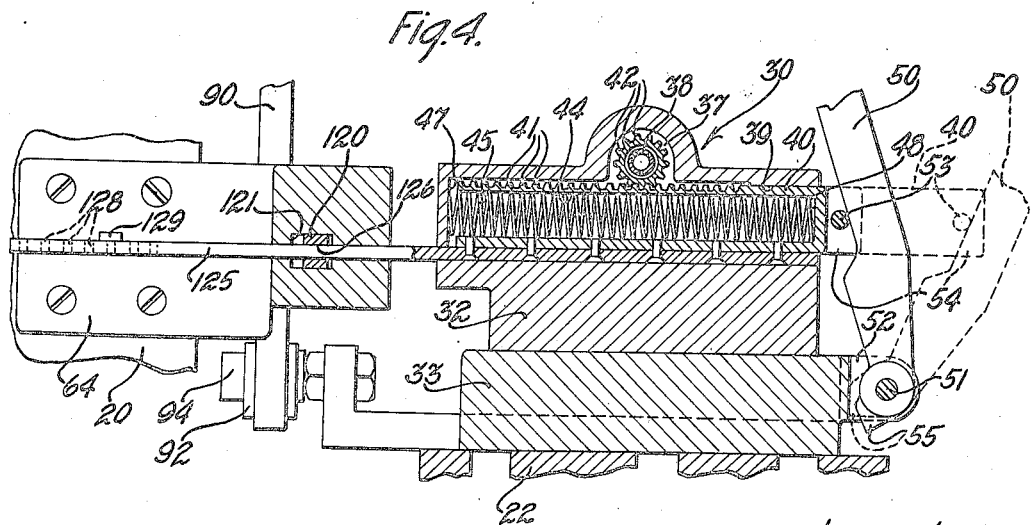

Oct. 13, 1931. J. S. STULL 1,827,302
MATERIAL WORKING APPARATUS
Filed Feb. 15, 1927 5 Sheets-Sheet 5
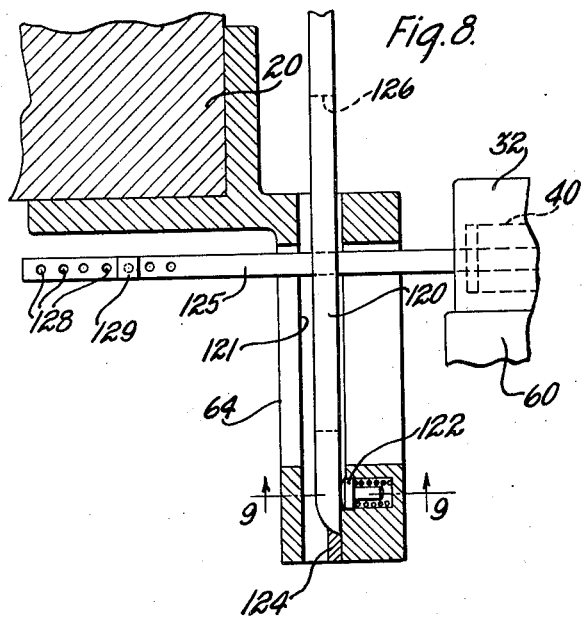
Fig. 8.
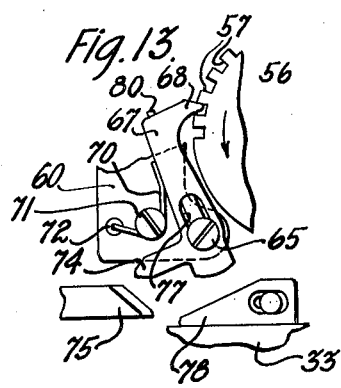
Fig. 13.
Fig. 9.
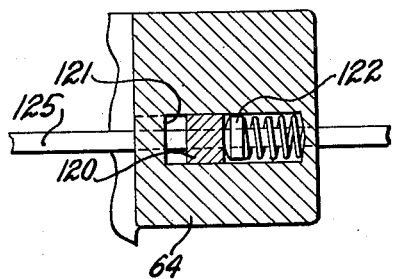
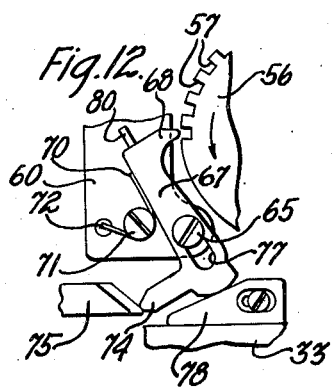
Fig. 12.
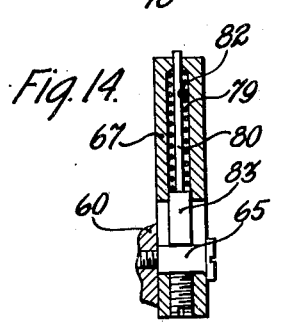
Fig. 14.
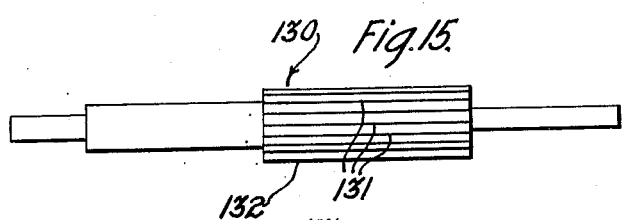
Fig. 15.
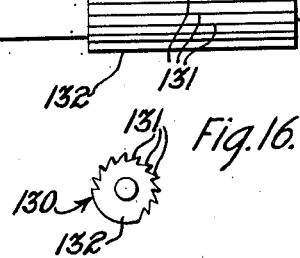
Fig. 16.
Inventor
John S. Stull
by [signature]
Att'y.

Patented Oct. 13, 1931

1,827,302

UNITED STATES PATENT OFFICE

JOHN STANLEY STULL, OF CHICAGO, ILLINOIS, ASSIGNOR TO WESTERN ELECTRIC COMPANY, INCORPORATED, OF NEW YORK, N. Y., A CORPORATION OF NEW YORK

MATERIAL WORKING APPARATUS

Application filed February 15, 1927. Serial No. 168,291.

This invention relates to material working apparatus, and more particularly to improvements in milling machines.

The object of the invention is the provision of simple, efficient and inexpensive attachments for milling machines whereby milling operations may be performed automatically.

In accordance with the general features of the invention, there is provided in one embodiment thereof a self-contained unit adapted to be secured to the reciprocable table of a manually operated milling machine of any well known construction. A spring actuated rack arranged to engage a pinion secured to or formed integral with the work holding arbor serves to rotate the arbor to index the work, the arbor being normally held stationary by a trip latch mechanism actuated through a suitable cam arrangement by the movement of the milling machine table. A removable self-contained attachment is also provided for automatically reciprocating the table during the milling operation. Means is also provided for automatically stopping the movement of the table when a predetermined number of milling operations have been performed.

Other objects and advantages of the invention will become apparent from the following detailed description and the novel features of the invention will be particularly pointed out in the appended claims.

In the accompanying drawings which illustrate one embodiment of the invention,

Fig. 3 is a side elevation, partly in section, thereof;

Fig. 4 is a fragmentary vertical section taken on line 4—4 of Fig. 1;

Fig. 5 is a fragmentary vertical section taken on line 5—5 of Fig. 1;

Fig. 6 is a fragmentary detail section taken on line 6—6 of Fig. 1;

Fig. 7 is a detail section taken on line 7—7 of Fig. 6;

Fig. 8 is a fragmentary plan section taken on line 8—8 of Fig. 2;

Fig. 9 is an enlarged detail section taken on line 9—9 of Fig. 8;

Fig. 10 is a fragmentary detail section taken on line 10—10 of Fig. 1;

Figs. 12 and 13 are fragmentary detail views showing the operation of the trip latch mechanism;

Fig. 14 is an enlarged detail section of the trip lever, and

Figs. 15 and 16 are side and end views, respectively, of a telephone switch shaft in which a plurality of teeth have been cut by an apparatus embodying the features of the invention.

Figure 1:
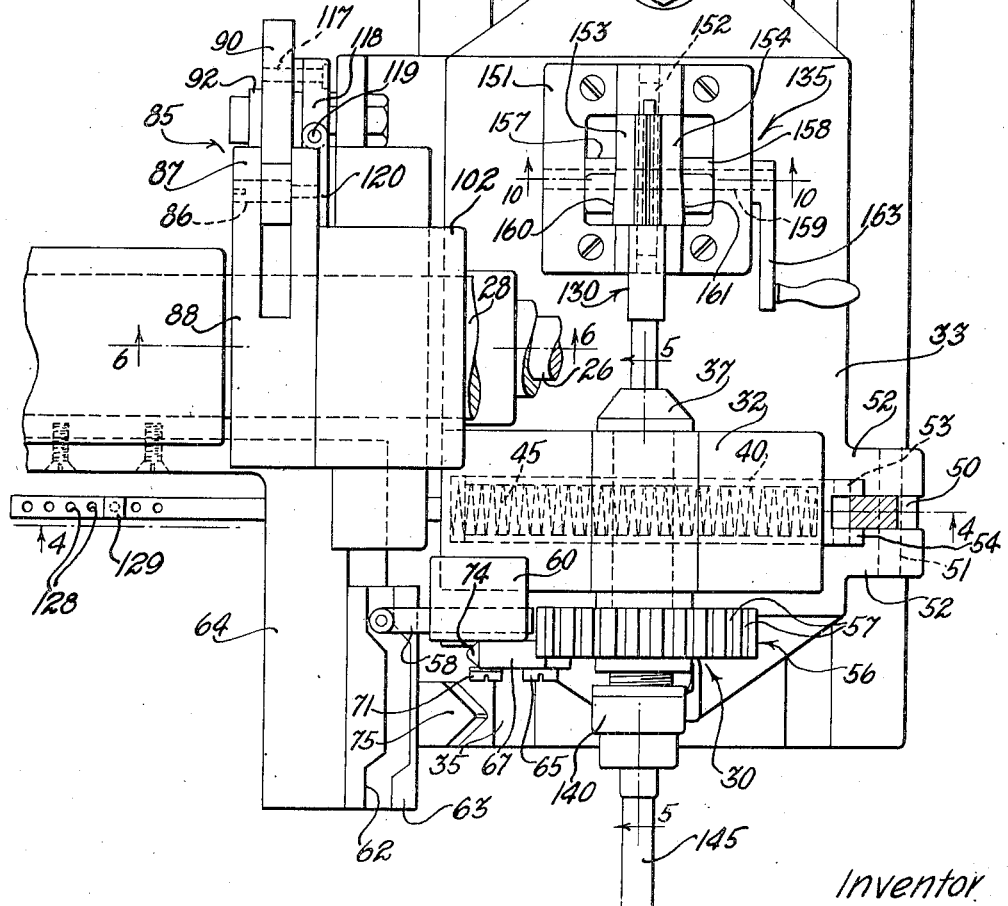
Fig. 1 is a plan view of milling apparatus embodying the features of the invention, portions of the supporting frame being omitted in order to more clearly illustrate the invention.

Referring now to the drawings in detail wherein like reference numerals designate corresponding parts throughout the several views, the numeral 20 indicates a portion of a milling machine pedestal or supporting frame provided with the usual guideway 21 (Fig. 2) for a reciprocable carriage or table 22, which in the present embodiment of the invention is automatically reciprocated to and from a power driven cutter 24 by mechanism hereinafter described. The cutter 24 is mounted in the usual manner upon an arbor 26 rotatably journaled in the frame 20. The usual overhead support 28 and depending bracket 29 is provided for accurately centering the cutting tool. The tool arbor 26 may be driven from any suitable source of power (not shown) and thus constitutes means for driving the cutter 24.

Figure 2:
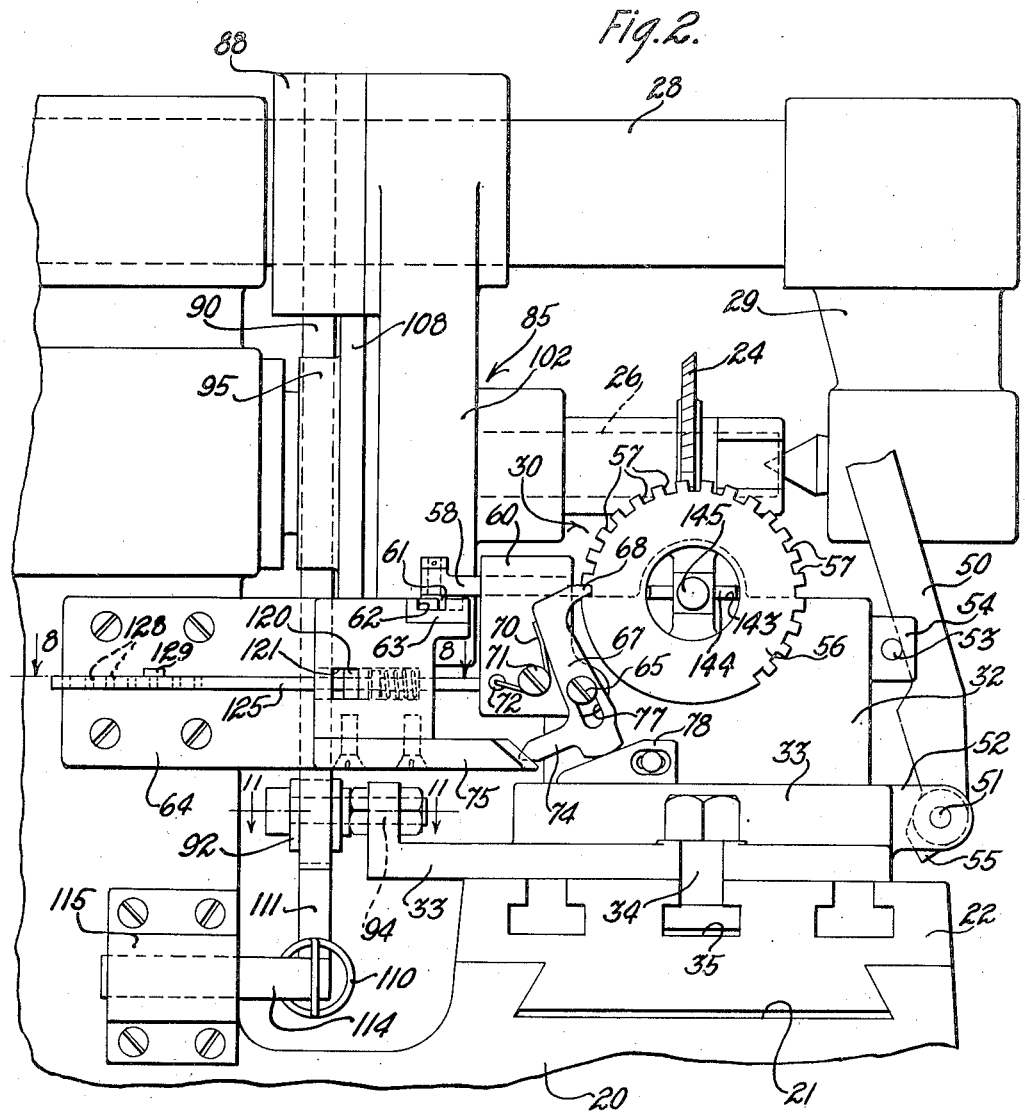
Fig. 2 is a front elevation of the structure shown in Fig. 1.

The improved word indexing mechanism is a self-contained removable unit designated as a whole in the drawings by the reference numeral 30, and comprises a main supporting frame or head stock 32 which is secured at one end of a base plate 33. The base plate 33 is adapted to be removably attached to the table 22 of the milling machine by means of bolts 34—34, the heads of which engage a T-slot 35 provided in the table (Figs. 1 and 2).

Rotatably journaled in the head stock 32 is a work holding spindle 37 (Figs. 3 and 5) within which is mounted a spring collet 38, the operation of which will be described in detail hereinafter. The head stock 32 is provided with a longitudinal bore 39 (Figs. 4 and 5) of substantially circular cross section and extending substantially the entire width thereof. Slidably mounted within this bore is a horizontally disposed rack 40, the teeth 41 of which operatively engage pinion teeth 42 formed in the periphery of the spindle 37. The rack 40 is provided with a longitudinal bore 44 within which is disposed a helical compression spring 45 which normally tends to move the rack to the right to rotate the spindle 37 in a counter-clockwise direction (Fig. 4). One end of the spring 45 engages an end wall 47 of the bore 39 and the opposite end thereof engages an end wall 48 of the bore 44.

Before each operation of the apparatus, energy is stored in the spring 45 by means of a hand lever 50 which is pivoted at one end upon a pin 51 mounted in outwardly projecting ear portions 52—52 formed integral with the base plate 33. The lever 50 is positioned to engage a pin 53 mounted in a bifurcated end portion 54 of the rack 40. It will be understood that when the hand lever 50 is turned in a counter-clockwise direction (Fig. 4), the rack 40 is moved to the left, thereby compressing the spring 45. A lug 55 projecting from the pivoted end of the hand lever and designed to contact with the side of the base plate 33 serves as a stop to limit the movement of the hand lever in a clockwise direction, as shown in dotted outline in Fig. 4.

The spindle 37 is normally held stationary by means of a trip latch arrangement which will now be described. Secured to the spindle 37 is an indexing wheel 56 having a plurality of peripheral teeth 57. A pawl 58 slidably mounted in a guide block 60 (Figs. 1 and 2) secured to the head stock 32 and designed to engage the teeth 57 of the indexing wheel serves to maintain the work holding spindle in a fixed position during the milling operation. A roller 61 carried at the outer end of the pawl 58 engages a cam groove 62 formed in a plate 63 which is secured to a bracket 64 attached to the frame 20. During the movement of the table 22 the roller 61 rides in the cam groove 62 which is designed so that the pawl is disengaged from the indexing wheel upon the table approaching the end of its movement in either direction. The purpose of this arrangement will presently appear.

Rotatably supported upon a pin 65 secured to the block 60 is a trip lever 67 (Figs. 2, 12 and 13) having a tooth 68 formed at one end thereof designed to engage the teeth 57 of the indexing wheel 56. The lever 67 is normally held in operative engagement with the indexing wheel by a helical spring 70 mounted on a pin 71 secured to the block 60. One end of the spring 70 engages the side of the trip lever 67 and the opposite end thereof is fastened to a pin 72 secured to the block 60. The construction and arrangement is such that the trip lever 67 normally prevents rotation of the indexing wheel in a counter-clockwise direction (Fig. 2) but permits its rotation in a clockwise direction. The lever 67 is provided on its tail end with a transverse portion 74 which, during the reciprocation of the table 22, engages a cam 75 secured to the bracket 64. The cam 75 serves to turn the trip lever in a counter-clockwise direction (Fig. 2) causing it to become disengaged from the indexing wheel.

The trip lever 67 is also provided with an elongated slot 77 by means of which it is slidable in a substantially vertical direction upon the pin 65, its downward movement being limited by an adjustable stop 78 secured to the base plate 33 (Figs. 2, 12 and 13). A helical spring 79 (Fig. 14) serves to normally hold the lever 67 in the position shown in Fig. 13, wherein it is disengaged from the stop 78. The spring 79 encircles a plunger 80 which is slidable in a longitudinal guideway 82 formed in the trip lever 67 (Fig. 14). An enlarged end 83 of the plunger engages the pin 65 and the opposite end of the plunger is adapted to slide through the end of the trip lever. The spring 79 is disposed between the enlarged end 83 of the plunger and the opposite end of the guideway 82.

The operation of the above described latch mechanism is as follows: When starting the operation of the machine, the table 22 is in the position shown in Fig. 1, and the pawl 58 is therefore disengaged from the indexing wheel 56 due to the construction of the cam groove 62 as shown. The indexing wheel 56 may therefore be rotated in a clockwise direction (Fig. 2) by the hand lever 50, the trip lever 67 being designed so as to permit the free rotation of the indexing wheel in a clockwise direction, but preventing its rotation in a counter-clockwise direction. At the starting position, the trip lever 67 is engaged with the first tooth of the indexing wheel, as shown in Fig. 2. Upon starting the movement of the table 22, the pawl 58 is caused to engage the first tooth of the indexing wheel and will remain engaged therewith throughout the first milling operation due to the shape of the cam groove 62, thereby maintaining the work holding spindle 37 in a fixed position. During the movement of the table 22, the cam 75 engages the transverse portion 74 of the trip lever causing it to become disengaged from the indexing wheel as shown in Fig. 12, whereupon the trip lever is moved upwardly to the position shown in Fig. 13 by the spring actuated plunger 80. As soon as the trip lever has passed by the cam 75 it is caused to engage the next tooth of the indexing wheel (Fig. 13) due to the action of the spring 70. As the table 22 approaches the end of its movement, the pawl 58 is disengaged from the first tooth of the indexing wheel whereupon the indexing wheel is turned in a counter-clockwise direction by the spring actuated rack 40 until the trip lever 67 engages the stop 78. At the beginning of the movement of the table in the opposite direction, the pawl 58 is caused to engage the next tooth of the indexing wheel. As the table continues to move, the trip lever is again disengaged from the indexing wheel by the cam 75 and moved upwardly by the spring actuated plunger 80, whereupon it is engaged with the next tooth of the indexing wheel due to the action of the spring 70. This operation continues until all of the milling operations have been completed.

Figure 11:
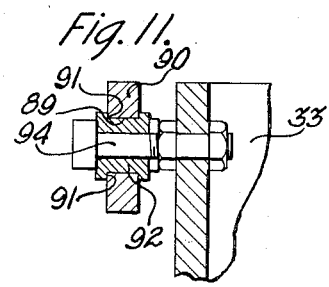
Fig. 11 is a fragmentary detail section taken on line 11—11 of Fig. 2.

Means cooperating with the indexing mechanism 30 and indicated generally by the reference numeral 85 is provided for automatically reciprocating the milling machine table. Pivotally supported at one end upon a pin 86 mounted in an outwardly projecting bifurcated portion 87 of a supporting block 88 secured to the overhead supporting shaft 28 is a cam lever 90 (Fig. 3), the opposite end of which is provided with a rectangular slot 89 by means of which it is slidable in grooves 91—91 (Fig. 11) of a block 92 rotatably carried upon a pin 94 secured to the base plate 33. The arrangement is such that a reciprocating movement of the cam lever 90 on its pivot 86 imparts a corresponding movement to the table 22. Motion is imparted to the cam lever 90 by a cam 95 (Fig. 3) which is positioned to engage a roller 96 carried by the cam lever intermediate its ends.

The cam 95 is driven by the arbor 26 by the following epicyclic gear arrangement: Rotatably carried upon an eccentric hub 97 (Figs. 6 and 7) secured to the arbor 26 is a ring gear 98 which meshes with a pair of internal gears 100 and 101. The gear 100 is secured to a stationary housing 102 which is mounted upon the arbor 26 and secured to the overhead support 28. The gear 101 rotates freely within the housing 102 and is provided with one more tooth than the gear 100. Due to this construction, it is obvious that rotation of the arbor 26 in the direction indicated by the arrow (Fig. 7) causes a rolling engagement of the ring gear 98 with the internal gears 100 and 101, and since the gear 101 has one more tooth than the gear 100, it will be understood that for each complete revolution of the arbor 26 the gear 101 is rotated a fraction of a revolution in a direction opposite to that of the arbor 26, the amount of this rotation depending on the number of teeth in the gear 101. Assuming that the gears 100 and 101 are provided with sixty-three and sixty-four teeth, respectively, as is the case in the present embodiment of the invention, it will be apparent that the gear 101 will make one complete revolution in the direction indicated by the arrow (Fig. 7) to sixty-four revolutions of the arbor 26.

The cam 95 is rotatably supported upon a bushing 104 (Fig. 6) secured to the arbor 26 and is provided with a peripheral flange 108 by means of which it is secured to the gear 101 so as to be rotatable therewith. A helical tension spring 110 (Fig. 3) fastened at one end to an arm 111 of an L-shaped member 112 secured to the cam lever 90 and attached at its opposite end to a post 114 secured to the frame 20 by a bracket 115 serves to maintain the cam lever 90 in engagement with the cam 95 at all times.

Means is provided for automatically stopping the movement of the milling machine table when a predetermined number of milling operations have been performed. Pivoted at one end upon a horizontally disposed pin 117 (Figs. 1 and 3) secured to the lower end of the cam lever 90 is an arm 118 which carries at its opposite end a vertically disposed pin 119. A horizontally disposed bar 120 is pivoted at one end upon the pin 119 and is slidable in a guideway 121 (Figs. 8 and 9) formed in the bracket 64. The guideway 121 is slightly wider than the bar 120 as best shown in Fig. 8. A spring pressed plunger 122 suitably mounted within the bracket 64 serves to normally hold the bar 120 toward the left side of the guideway 121. Secured to the opposite side of the guideway and near the forward end thereof is a stop block 124 which is sufficiently spaced from the left side of the guideway to allow the bar 120 to slide freely therethrough.

Secured to the rack 40 so as to be movable therewith is a horizontally disposed bar 125, one end of which protrudes through the end of the head stock 32, as best shown in Figs. 4 and 8. The bar 125 passes through a rectangular slot 126 (Fig. 3) provided therefor in the bar 120 and is provided at its end with a plurality of threaded apertures 128 for the attachment of an adjustable stop 129. The stop 129 is positioned to engage the bar 120 when a predetermined number of milling operations have been performed. This engagement of the bar 120 by the stop 129 causes the bar 120 to be moved to the right of the guideway 121 against the action of the spring pressed plunger 122 whereupon the forward end thereof engages the stop block 124, thus stopping the movement of the milling machine table.

The above described apparatus is particularly adapted for cutting a plurality of teeth 131 in an enlarged cylindrical portion 132 of a telephone switch shaft 130 (Figs. 15 and 16). The shaft 130 is supported in a horizontal position, as shown in Fig. 3, one end thereof being rigidly secured in the spring collet 38 and the opposite end thereof being rotatably supported in a clamping device indicated generally in the drawings by the reference numeral 135. The spring collet 38 is of the usual construction, the work engaging end thereof being tapered as indicated at 136 whereby a slight movement thereof to the left (Figs. 3 and 5) causes it to firmly grip the work due to a tapered surface 137 formed at the end of the bore in the spindle 37. A helical compression spring 139 (Fig. 5) interposed between the collet 38 and a cap 140 threaded upon the end of the spindle normally tends to move the collet to the right whereby the work is released and readily removable. Secured at one end to the collet 38 is a link 142, the opposite end of which protrudes through the cap 140 and carries a pin 144. The pin 144 projects outwardly from opposite sides of the link 142 and is adapted to ride in oppositely disposed slots 143—143 provided therefor in the cap 140. A hand lever 145 pivoted upon the pin 144 is provided with a cam surface 147 at the pivoted end thereof which engages the end of the cap 140 and is designed so that by turning the lever 145 to the position shown in Fig. 5 from the position shown in dotted outline, the collet 38 is moved to the left against the action of the spring 139 and the work is firmly gripped.

The clamping device 135 is mounted on a tail stock 150 (Fig. 3) secured to the base plate 33 opposite the head stock 32 and comprises a supporting block 151 (Fig. 10) within which a horizontally disposed pin 152 is suitably mounted. Pivoted upon the pin 152 are a pair of oppositely disposed jaw members 153 and 154 which are normally held spaced from each other by a helical spring 155 also mounted upon the pin 152. A pair of arms 157 and 158 are secured to a horizontally disposed shaft 159 rotatably supported in the block 151 and are arranged to engage cam surfaces 160 and 161 (Fig. 1) formed on the outer sides of the jaw members 153 and 154, respectively, when the shaft 159 is rotated in a counter-clockwise direction (Fig. 3). The arms 157 and 158 are actuated by a hand lever 163 secured to the shaft 159. It will be understood that by turning the hand lever 163 in a clockwise direction (Fig. 3), the arms 157 and 158 are disengaged from the cam surfaces 160 and 161, respectively, and the jaw members are separated by the spring 155, thus permitting the removal of the completed work.

It is believed that the invention will be more clearly understood from the following brief description of the operation of the above described apparatus. A blank having been clamped in position and tension having been stored in the spring 45 in the manner hereinbefore described, the milling operation is started by starting the rotation of the cam 95 and the cutter 24, both of which are driven by the arbor 26 as described above. Upon the projection 165 of the cam 95 engaging the roller 96 carried by the cam lever 90, it is apparent that the cam lever together with the bar 120 is moved to the right (Fig. 3), causing the tapered forward end of the bar 120 to become disengaged from the stop 124 (Fig. 8) whereupon the bar 120 is moved toward the left side of the guideway 121 (Figs. 8 and 9) by the spring pressed plunger 122. When in this position, the stop bar 120 is free to reciprocate back and forth through the guideway 121 and therefore the rotation of the cam 95 imparts a reciprocatory movement to the table 22 through the cam lever 90 and the spring 110 in the manner hereinbefore described.

During each movement of the table, one tooth is milled in the blank by the rotating cutter 24 and at the end of each movement of the table, the blank is automatically indexed by the above described spring actuated rack 40, the operation of which is controlled by the cam operated latch mechanism through the movement of the table. When a predetermined number of milling operations have been completed, the bar 120 is moved toward the left side of the guideway 121 (Figs. 8 and 9) by the stop 129 and upon the end of the next movement of the bar 120 to the right (Fig. 3) the tapered end thereof engages the stop 124, thus stopping the movement of the table. It should be understood that the mechanism is constructed and arranged so that the table always stops in the position shown in the drawings, thereby facilitating the removal of the milled part and the insertion of another blank.

Although the invention, as herein illustrated and described, is particularly well adapted for use in connection with a manually operated milling machine for cutting a plurality of teeth in a cylindrical blank, it should be understood that the novel features of the invention are capable of other applications within the scope of the appended claims.

What is claimed is:

1. An indexing mechanism for material working apparatus, comprising means for securing the material, means for actuating the material securing means and having a compression member, means for actuating the last mentioned means to store energy in the compression member, and means providing intermittent release of the compression member a predetermined amount to index the material.

2. An indexing mechanism for material working apparatus, comprising a rotatable spindle for holding the material, a rack for actuating the spindle geared directly thereto through teeth formed integrally thereon, a resilient member for actuating the rack, means for moving the rack to compress the resilient member, and means for releasing the rack and resilient member at predetermined intervals to index the material.

3. An indexing mechanism for material working apparatus, comprising a rotatable means for securing the material, resilient means for actuating the rotatable means, means for compressing the resilient means, and means for releasing the resilient means to index the material, the last mentioned means including a double ratchet device comprising a pawl for securing the material in one indexed position and an advancing pawl for determining the next indexing position of the material.

4. In a material working apparatus, a supporting frame, a carriage reciprocally mounted thereon, a rotatable spindle journaled in the carriage for holding the material, a rack having a resilient member normally compressed for actuating the spindle, a ratchet wheel connected to the spindle and regulating release of the resilient member to index the material, a pawl mounted on the carriage for engaging the ratchet wheel, a cam secured to the supporting frame designed to effect engagement of the pawl with the ratchet wheel during the working of the material, a second pawl mounted in the carriage for engaging the ratchet wheel, and a second cam secured to the supporting frame designed to advance the second pawl into engagement with the ratchet wheel before the first pawl engaged therewith is withdrawn.

5. In a material working apparatus, a supporting frame, a carriage reciprocally mounted thereon, a rotatable spindle journaled in the carriage for holding the material, a rack having a resilient member normally compressed for actuating the spindle, a pawl and ratchet mechanism connected to the spindle limiting the releasing movement of the rack to index the material, and cams provided on the supporting frame for actuating the pawl and ratchet mechanism to index the material at both ends of the reciprocation of the carriage.

6. An indexing mechanism for material working apparatus, comprising means for securing the material, means for actuating the material securing means and having a compression member, means for actuating the last mentioned means to store energy in the compression member, means providing intermittent release of the compression member a predetermined amount to index the material, and means for automatically stopping the release of the compression member after a predetermined number of indexing operations.

In witness whereof, I hereunto subscribe my name this 31st day of January, A. D. 1927.

JOHN STANLEY STULL.